United States Patent
Vogel et al.

(10) Patent No.: US 8,625,086 B2
(45) Date of Patent: Jan. 7, 2014

(54) DETERMINING COORDINATES OF A TARGET IN RELATION TO A SURVEY INSTRUMENT HAVING A CAMERA

(75) Inventors: Michael Vogel, Schleifreisen (DE); Set Svanholm, Sollentuna (SE); Christian Grässer, Vallentuna (SE)

(73) Assignee: Trimble AB, Danderyd (SE)

( * ) Notice: Subject to any disclaimer, the term of this patent is extended or adjusted under 35 U.S.C. 154(b) by 581 days.

(21) Appl. No.: 12/735,582

(22) PCT Filed: Feb. 12, 2008

(86) PCT No.: PCT/EP2008/001053
§ 371 (c)(1),
(2), (4) Date: Sep. 28, 2010

(87) PCT Pub. No.: WO2009/100728
PCT Pub. Date: Aug. 20, 2009

(65) Prior Publication Data
US 2011/0007154 A1 Jan. 13, 2011

(51) Int. Cl.
*H04N 7/18* (2006.01)
*G01S 3/783* (2006.01)

(52) U.S. Cl.
USPC ........................ 356/141.5; 348/142

(58) Field of Classification Search
USPC .......................................... 348/142
See application file for complete search history.

(56) References Cited

U.S. PATENT DOCUMENTS 5,949,548 A 9/1999 Shirai et al.
6,384,902 B1 5/2002 Schneider (Continued)

FOREIGN PATENT DOCUMENTS

CN 1727845 A 2/2006
CN 101101210 1/2007

(Continued)

OTHER PUBLICATIONS

Zhang et al.: "Photo Total Station System an Integration of Metric Digital Camera and Total Station" Conference on Optical 3-D Measurement Techniques (vol. I, pp. 176-182) Sep. 22, 2003.

(Continued)

*Primary Examiner* — Sath V Perungavoor
*Assistant Examiner* — Howard D Brown, Jr.
(74) *Attorney, Agent, or Firm* — Harness, Dickey & Pierce, P.L.C.

(57) ABSTRACT

A method is disclosed for determining coordinates of a target in relation to a surveying instrument wherein a first image is captured using a camera in a first camera position and orientation, a target is selected by identifying an object point in the first image, and first image coordinates of the object point in the first image are measured. The surveying instrument is then rotated around the rotation center so that the camera is moved from the first camera position and orientation to a second camera position and orientation, while retaining the rotation center of the surveying instrument in a fixed position. A second image is captured using the camera in the second camera position and orientation, the object point identified in the first image is identified in the second image, and second image coordinates of the object point in the second image are measured. Target coordinates in relation to the rotation center of the surveying instrument are then determined based on the first camera position and orientation, the first image coordinates, the second camera position and orientation, the second image coordinates, and camera calibration data. Furthermore, a surveying instrument for performing the method is disclosed.

19 Claims, 7 Drawing Sheets

(56) References Cited

U.S. PATENT DOCUMENTS

| | | |
|---|---|---|
| 6,411,372 B1 | 6/2002 | Donath et al. |
| 6,453,569 B1 | 9/2002 | Kumagai et al. |
| 6,559,931 B2 | 5/2003 | Kawamura |
| 6,688,010 B1 | 2/2004 | Schwaerzler |
| 7,200,945 B2 | 4/2007 | Endo |
| 7,503,123 B2 * | 3/2009 | Matsuo et al. ............ 33/290 |
| 7,508,980 B2 * | 3/2009 | Otani et al. ............ 382/154 |
| 7,697,749 B2 | 4/2010 | Ogawa |
| 2003/0048438 A1 | 3/2003 | Kawamura et al. |
| 2004/0131248 A1 | 7/2004 | Ito et al. |
| 2005/0057745 A1 | 3/2005 | Bontje |
| 2006/0013474 A1 | 1/2006 | Kochi et al. |
| 2006/0017938 A1 | 1/2006 | Ohtomo et al. |
| 2006/0021236 A1 | 2/2006 | Endo |
| 2006/0167648 A1 | 7/2006 | Ohtani |
| 2007/0065004 A1 * | 3/2007 | Kochi et al. ............ 382/162 |
| 2007/0104353 A1 | 5/2007 | Vogel |
| 2008/0120855 A1 | 5/2008 | Matsuo et al. |
| 2010/0074532 A1 * | 3/2010 | Gordon et al. ............ 382/203 |

FOREIGN PATENT DOCUMENTS

| | | |
|---|---|---|
| CN | 101101210 A | 1/2008 |
| DE | 144 967 | 11/1980 |
| DE | 10 2007 030 784 | 1/2008 |
| EP | 0 971 207 | 1/2000 |
| EP | 0 997 704 | 5/2000 |
| EP | 1 139 062 | 10/2001 |
| EP | 1 607 718 | 12/2005 |
| EP | 1 655 573 | 5/2006 |
| JP | 4-198809 | 7/1992 |
| JP | 2000-013060 | 1/2000 |
| JP | 2000131060 A | 5/2000 |
| JP | 2005-017262 | 1/2005 |
| JP | 2007-147422 | 6/2007 |
| WO | WO 2004/057269 | 7/2004 |
| WO | WO2005/059473 | 6/2005 |
| WO | WO 2009/100774 | 8/2009 |
| WO | WO 2009/100773 | 9/2009 |
| WO | WO 2009/106141 | 9/2009 |

OTHER PUBLICATIONS

International Preliminary Report on Patentability and Written Opinion dated Apr. 15, 2010 issued in related application No. PCT/EP2008/052531.

International Search Report dated Dec. 9, 2008 in related application No. PCT/EP2008/052531.

International Search Report dated Nov. 12, 2008 in related application No. PCT/EP2008/058183.

International Search Report dated Nov. 6, 2008 in related application No. PCT/EP2008/058175.

Chinese Office Action dated Mar. 12, 2012 issued in corresponding Chinese Application No. 200880125829.7 and English translation thereof.

Zhang, Z. "Determining the Epipolar Geometry and its Uncertainty: A Review." *International Journal of Computer Vision*, 27(2), 161-198, 1998.

U.S. Office Action dated Feb. 26, 2013 for co-pending U.S. Appl. No. 12/735,279.

Chinese Office Action dated Jun. 13, 2013 for Chinese Application No. 200880125829.7.

* cited by examiner

DETERMINING COORDINATES OF A TARGET IN RELATION TO A SURVEY INSTRUMENT HAVING A CAMERA

TECHNICAL FIELD

The present invention relates to surveying instruments, such as total stations. More particularly, the present invention relates to a method for determining coordinates of a target in relation to a surveying instrument having a camera for capturing a field of view and an identified target point within the field of view.

BACKGROUND

In surveying, the use of a camera in a geodetic instrument may provide for improved user convenience and new functions. Particularly, a view such as an image or a video feed provided by the camera and shown on a display of the instrument may be used for assisting target selection and for providing the user with an overview of potential points of interest.

One apparent difference between a traditional eyepiece and a video image shown on a display, is that the display image may have an active overlay of information. Various information may be given together with the captured image to facilitate instrument usage.

For a general background of total stations comprising a camera for capturing an image or a video feed of the view towards which the total station is aimed, reference is made to WO 2005/059473.

Surveying instruments of this kind, i.e. which includes a camera, are sometimes referred to as video-theodolites.

SUMMARY

In the field of video-theodolites, or more generally for geodetic instruments provided with a camera, problems arise when the camera center and the instrument rotation center do not coincide. Directions to targets from the camera center determined based on the camera image will normally not apply directly as directions to the target from the instrument rotation center.

The present invention provides a method for determining, in relation to a surveying instrument, target coordinates of a point of interest, or target, identified in two images captured by a camera in the surveying instrument.

When the camera center or perspective center and the rotation center of a surveying instrument are non-coincident (eccentric), it is generally not possible to directly determine a correct direction from the rotation center towards an arbitrary point identified or indicated in an image captured by the camera. In other words, if a direction from a camera to a target is determined from an image captured by the camera, the direction towards the target from the rotation center that is not coinciding with the camera center, will typically not be adequately determined by approximation using the direction from the camera. Only if the distance to the point of interest is known would it be possible to derive the correct direction from the rotation center to the target from the image. It is thus desirable to determine coordinates of the target with respect to the rotational center of the surveying instrument.

The present invention provides a method for determining coordinates of a target in relation to a surveying instrument wherein a first image is captured using a camera in a first camera position and orientation, a target is selected by identifying an object point in the first image, and, first image coordinates of the object point in the first image are measured. The surveying instrument is rotated around the rotation center so that the camera is moved from the first camera position and orientation to a second camera position and orientation. A second image is captured using the camera in the second position and orientation, the object point identified in the first image is identified also in the second image, and second image coordinates of the object point in the second image are measured. Even though a rotation is undertaken prior to capturing the second image, the rotation center of the surveying instrument is retained in a fixed position when the second image is captured, i.e. in the same position as when the first image was captured. Finally, coordinates of the target in relation to the rotation center of the surveying instrument are determined based on the first camera position and orientation, the first image coordinates, the second camera position and orientation, the second image coordinates, and camera calibration data.

The present invention makes use of an understanding that the coordinates of the point of interest from the surveying instrument can be determined by using the eccentricity of a camera in the surveying instrument for capturing two images from the camera in two known camera positions and orientations with intermediate rotation of the surveying instrument and identification of an object point and the coordinates thereof in the two images together with camera calibration data. When target coordinates with respect to the rotational center of the instrument have been determined, distance from the rotation center to the target can be determined. However, target coordinates may be used for other purposes than determining distance. For instance, it may be useful to measure coordinates of a ground mark very accurately for surveying instrument stationing.

The present invention also provides a total station which comprises various means for carrying out the above-described method.

In addition, the present invention can be implemented in a computer program that, when executed, performs the inventive method in a surveying instrument. The computer program may, for example, be downloaded into a surveying instrument as an upgrade. As will be understood, the inventive method can be implemented for a surveying instrument using software, hardware or firmware, or a combination thereof, as desired in view of the particular circumstances.

BRIEF DESCRIPTION OF THE DRAWINGS

In the following detailed description, reference is made to the accompanying drawings, on which.

DETAILED DESCRIPTION

Figure 1:
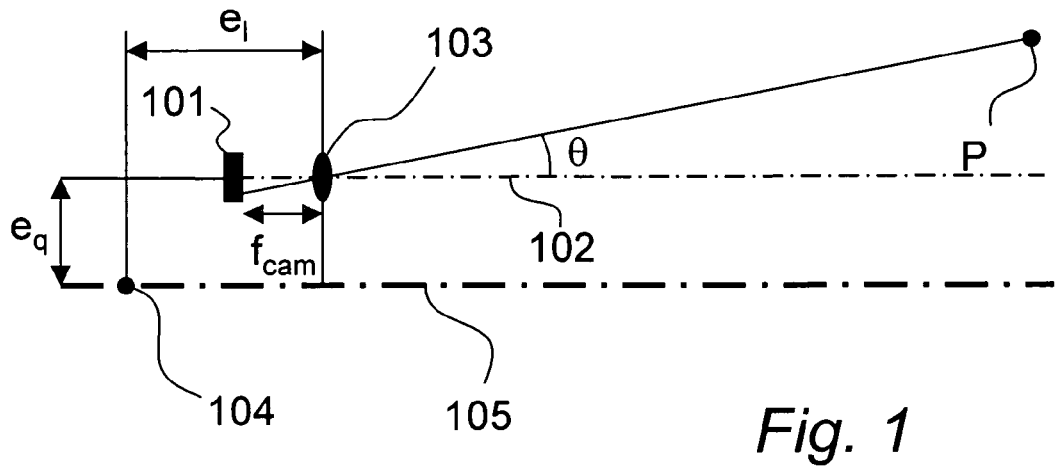
FIG. 1 is a schematic diagram showing, from the side, a situation for a surveying instrument having a camera that is eccentric to the instrument rotation center.

FIG. 1 illustrates schematically a situation where an object point relating to a target P is identified in an image captured by a camera in a surveying instrument. In the figure, there is shown a camera sensor 101, such as a CMOS camera or a CCD, for capturing an image centered about a camera axis 102. An image is formed on the camera sensor 101 by means of an optical system 103. The surveying instrument can be aimed at a desired target by rotation over horizontal and vertical angles about a rotation center 104 of the instrument. As illustrated in the figure, the optical system 103 for the camera is eccentric with respect to the rotation center of the instrument (separation $e_q$ and $e_l$, respectively, from the rotation center of the instrument). The camera axis 102 (center line for the camera view) is thus not collinear with the optical axis 105 of the instrument (i.e. optical line of sight), as illustrated in the figure. The camera optical axis 102 should ideally be perpendicular to the plane of the camera sensor 101 and the optical system 103 should be free from distortions or aberrations, which is not the case in practice.

Figure 3:
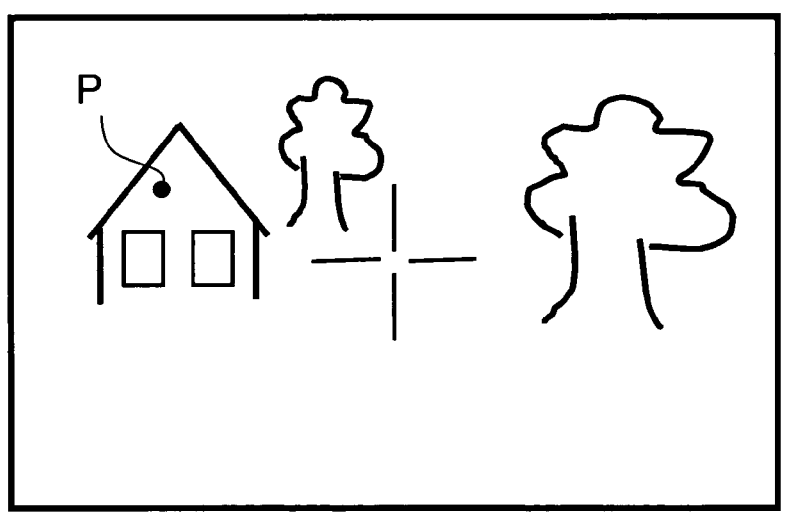
FIG. 3 schematically shows an image or video frame that may be captured by the camera and presented on a screen of the instrument.

FIG. 3 schematically shows an image captured by the camera. Such image may be presented to an operator using the surveying instrument, such that the operator may select the image object point of a target P by clicking in the image or otherwise indicating the desired object point. The optical axis (i.e. the optical line of sight) of the instrument is directed roughly towards the image center, which is indicated by the cross-hair in FIG. 3.

For determining the direction from the surveying instrument towards a selected target P, there are a number of functions implemented in the instrument. For example, if the direction to a target from the camera is expressed as horizontal and vertical angles $(\theta^x, \theta^y)$ from the camera axis, a function is provided in the instrument (or in an associated control unit) that determines the direction to a target from the camera by calculating the horizontal and the vertical angles $(\theta^x, \theta^y)$ based on pixel coordinates in the image or video feed captured by the camera. Hence, the function $f$ that calculates the horizontal and vertical angles $(\theta^x, \theta^y)$ based on image pixels can be described as $$(\theta^x, \theta^y) = f(x, y, C)$$

where x, y are the number of pixels (or more generally, pixel coordinates) of the desired target in the coordinate system of the camera, and C are calibration factors to be determined for each system. The calibration factors C include details about the camera, such as but not limited to, its eccentricity $e_q$ and $e_l$ and its focal length $f_{cam}$ (FIG. 1). For a general description of how to calculate horizontal and vertical angles based on an image captured by a camera in the instrument, reference is made to the above-mentioned WO 2005/059473.

Figure 2:
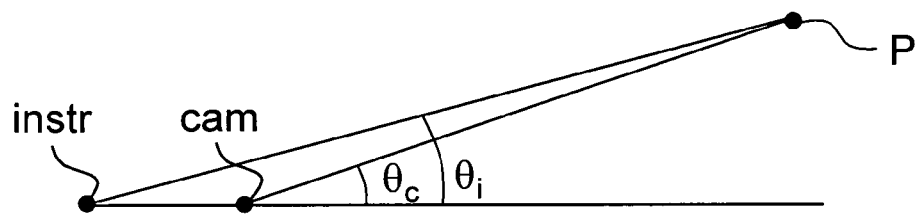
FIG. 2 schematically shows, from above, how the eccentricity between the camera and the instrument center leads to angle differences relative to an object point also in a situation where the instrument sight line and the camera line of sight are coaxial.

In order to find the direction to a target captured with an eccentric camera from an instrument using one image, e.g. for aiming the instrument towards the desired target P, it is necessary to know the distance to the target. To this end, it may be useful to study the schematic diagram shown in FIG. 2. FIG. 2 is a plan view taken from above, and illustrates the angles between the current line of sight (optical as well as EDM) and the desired target (P) for both the camera (cam) and the instrument (instr) center. The camera calibration data are used for determining the camera angle $\theta_c$ to the object point P, but the instrument angle $\theta_i$ to the object point P will be slightly different as indicated in FIG. 2. Hence, in order to find the direction to a target from an instrument using one image, e.g. for aiming the instrument towards the desired object point P, it is necessary to know the distance to the target. It should be understood that FIG. 2 is only a schematic illustration.

However, if two images are captured from a camera in a surveying instrument, where a first image is captured using the camera in a first camera position and orientation, said first camera position being eccentric to the rotation center of the surveying instrument, and a second image is captured using the camera in a second camera position and orientation, said second position being eccentric to the rotation center of the surveying instrument, by rotation of the surveying instrument around its rotation center so that the camera is moved from the first camera position and orientation to the second camera position and orientation, an object point corresponding to a target is identified in the first image and in the second image, and image coordinates for the object point in the first image and second image are measured, coordinates of the target with respect to the rotation center of the surveying instrument can be determined using camera calibration data.

Determining the direction towards the target from the rotation center of the surveying instrument is useful e.g. for aiming the surveying instrument towards the target for subsequent distance measuring. Determining the target distance from the rotation center of the surveying instrument is useful e.g. for determining a sample interval for a distance measuring instrument using time of flight measurements, focusing capability of EDM, and auto focus for a further camera or for a user.

Figure 4:
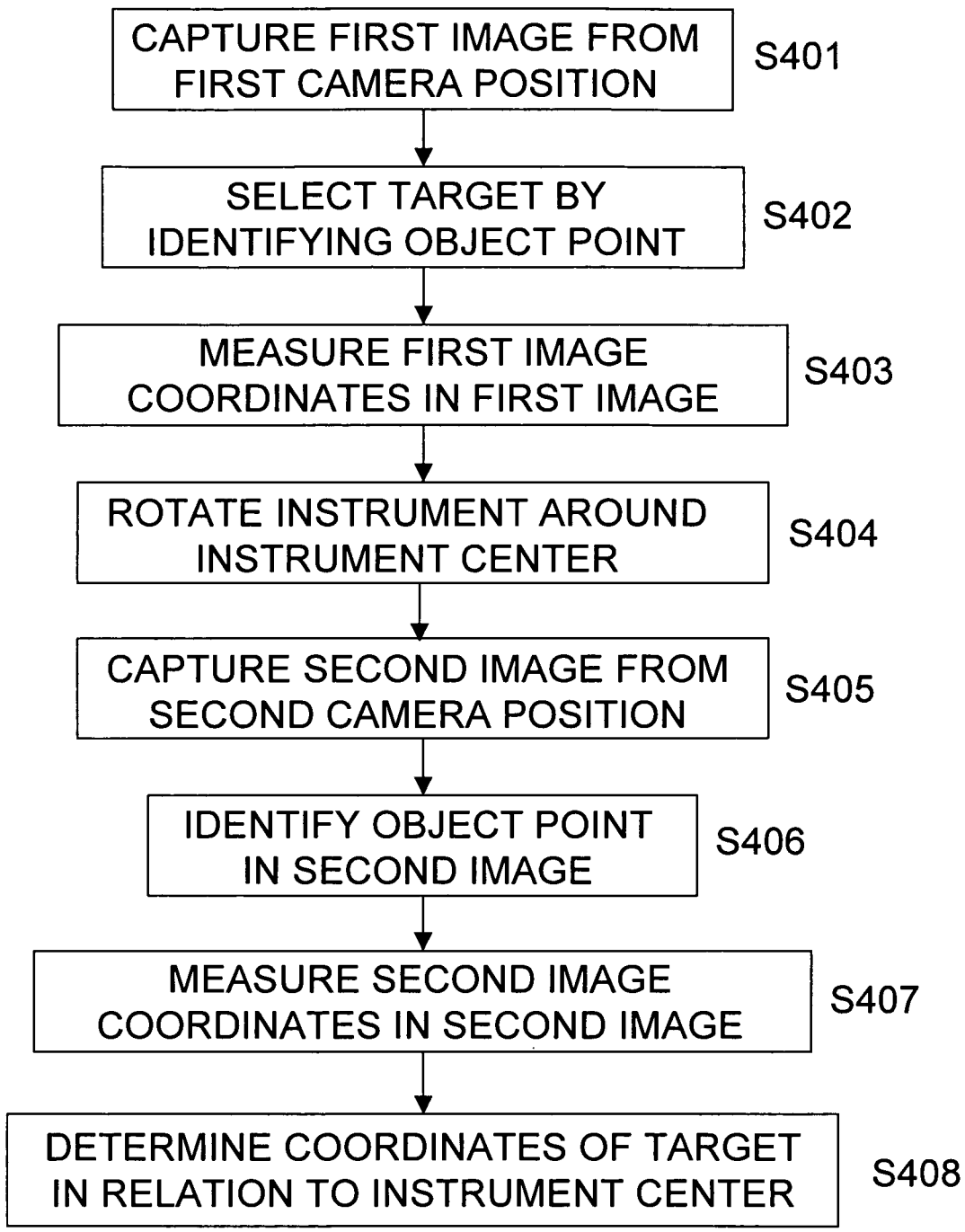
FIG. 4 is a general outline of the inventive method.

General steps of the method according to the present invention are outlined in FIG. 4. The method is performed in a surveying instrument comprising a camera and starts with capturing in a step S401 of a first image using said camera in a first camera position and orientation, the first camera position being eccentric to the rotation center of the surveying instrument, after which a target selection is performed in a step S402. An object point relating to the target, is identified in the first image which may be a snapshot or a frame of a video feed captured by the camera. For example, the target may be identified by selection by an operator clicking on a screen showing the image captured by the camera, or in any other suitable way of indicating the selected target with respect to the captured image. It is also envisaged that the target identification can be made in other ways, such as using prisms located at the target, edge detection, identification of target features (e.g. arrows), etc. In order to facilitate the target selection, it is preferred that it is indicated in the screen image the point at which the instrument line of sight is currently aimed, for example using a cross-hair, a dot or similar.

Once the target has been selected by identification of the object point in the first image in the step S402, first image coordinates of the object point in the first image are measured in a step S403.

In a step S404 the surveying instrument is rotated around the rotation center so that the camera is moved from the first camera position and orientation to a second camera position and orientation. The second camera position is eccentric to the rotation center of the surveying instrument. The first camera position and orientation is given by camera calibration data as well as the horizontal and vertical direction of the camera center to the instrument rotation center. Thus, the first camera position and orientation is determined by taking into account the horizontal and vertical direction of the camera center to the instrument rotation center, i.e. camera calibration data in the form of eccentricity parameters $e_q$ and $e_t$, such that camera coordinates are related to surveying instrument coordinates. Further, as will be discussed in the following, other calibration data can be considered, for example camera position independent parameters such as the so-called camera constant representing distance between the camera center and image plane and/or parameter of distortion, which depends on the image position. The second camera position and orientation can be derived from the rotation together with camera calibration data.

The method then proceeds with capturing in a step S405 a second image using the camera in the second camera position and orientation, after which the object point identified in the first image is identified in a step S406 in the second image. For example, the object point may be identified by selection by an operator clicking on a screen showing the image captured by the camera, or preferably by means of digital image processing.

Once the object point has been identified in the second image in step S406, second image coordinates of the object point in the second image are measured in a step S407.

Finally, coordinates of the target in relation to the rotation center of the surveying instrument are determined in a step S408 based on the first camera position and orientation, the first image coordinates, the second camera position and orientation, the second image coordinates, and camera calibration data.

Figure 5A:
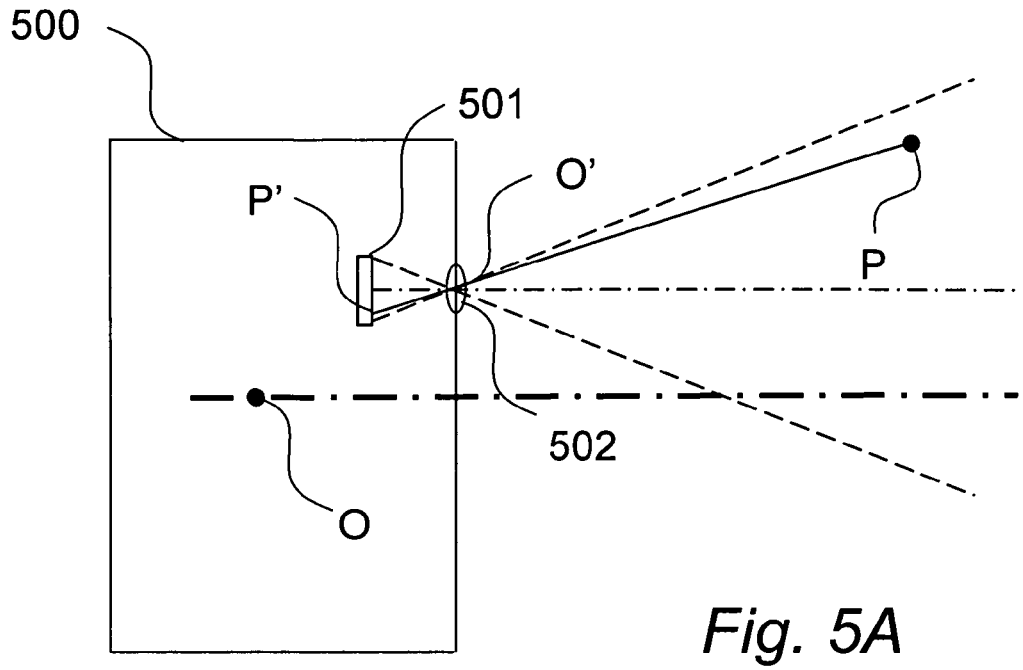
FIGS. 5A and 5B are schematic diagrams showing, from the side, a first implementation of a surveying instrument according to the invention having a camera that is eccentric to the instrument rotation center. Images are captured by the camera in two different positions using rotation of the surveying instrument.
Figure 5B:
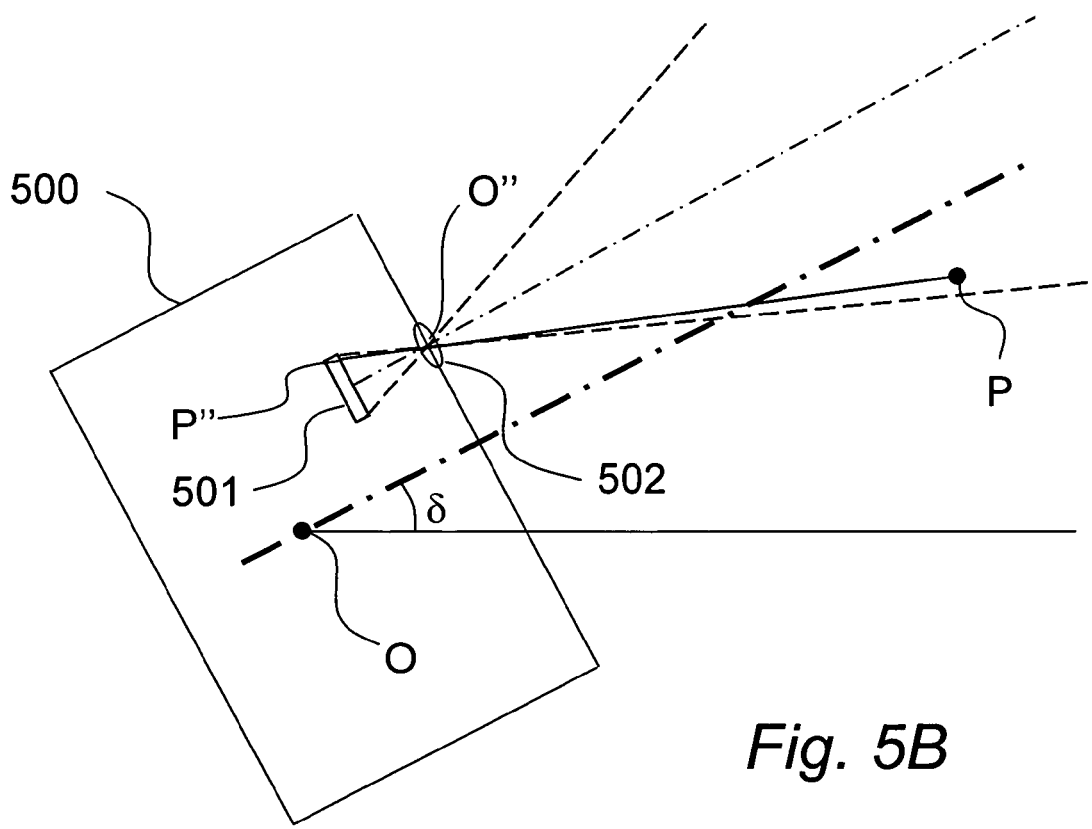

A first implementation of a surveying instrument is schematically shown in FIGS. 5A and 5B. For simplicity, the surveying instrument is shown in two dimensions. FIGS. 5A and 5B can be seen as either top or side views. However, it will be apparent to a skilled person how the teachings of the invention should be expanded to the three-dimensional case.

The surveying instrument 500 comprises a camera comprising a camera sensor 501 and an optical system 502. The camera has a camera center, or projection center, (indicated by O' in FIGS. 5A and O" in FIG. 5B) that is eccentric to the location O of the rotation center of the instrument 500. The camera may further be moved to different positions by rotation of the surveying instrument 500 around its rotation center. It is to be noted that the surveying is shown having a single camera since only one camera is required. However, the surveying instrument may well comprise more than one camera, e.g. a second camera used for a separate feature. It is to be noted that the camera is located above the line of sight of the instrument in the example FIGS. 5A and 5B. Of course the camera may have an arbitrary eccentric location with respect to the instrument rotation center.

In FIG. 5A, a first image is captured by the camera sensor 501, when the camera center is located in a first camera position O' eccentric to the location O of the rotation center of the surveying instrument 500 and having a first camera orientation. A target in position P is selected by identifying an object point in a position P' in the first image.

Once the target has been selected by identification of the object point in the first image, first image coordinates of the object point in the first image are measured.

In FIG. 5B, the camera center has been moved from the first position O' and first camera orientation to a second camera position O" and second camera rotation by rotation of the instrument 500 around the rotation center by a rotation angle $\delta$. A second image is captured by the camera sensor 501, when the camera center is located in the second camera position O" eccentric to the location O of the rotation center of the surveying instrument 500 and having the second camera orientation. The object point identified in the first image is identified also in the second image in a position P".

Once the object point has been identified in the second image, second image coordinates of the object point in position P" in the second image are measured.

Finally, coordinates of the target P in relation to the rotation center O of the surveying instrument are determined based on the first camera position and orientation, the first image coordinates, the second camera position and orientation, the second image coordinates, and camera calibration data.

Figure 6:
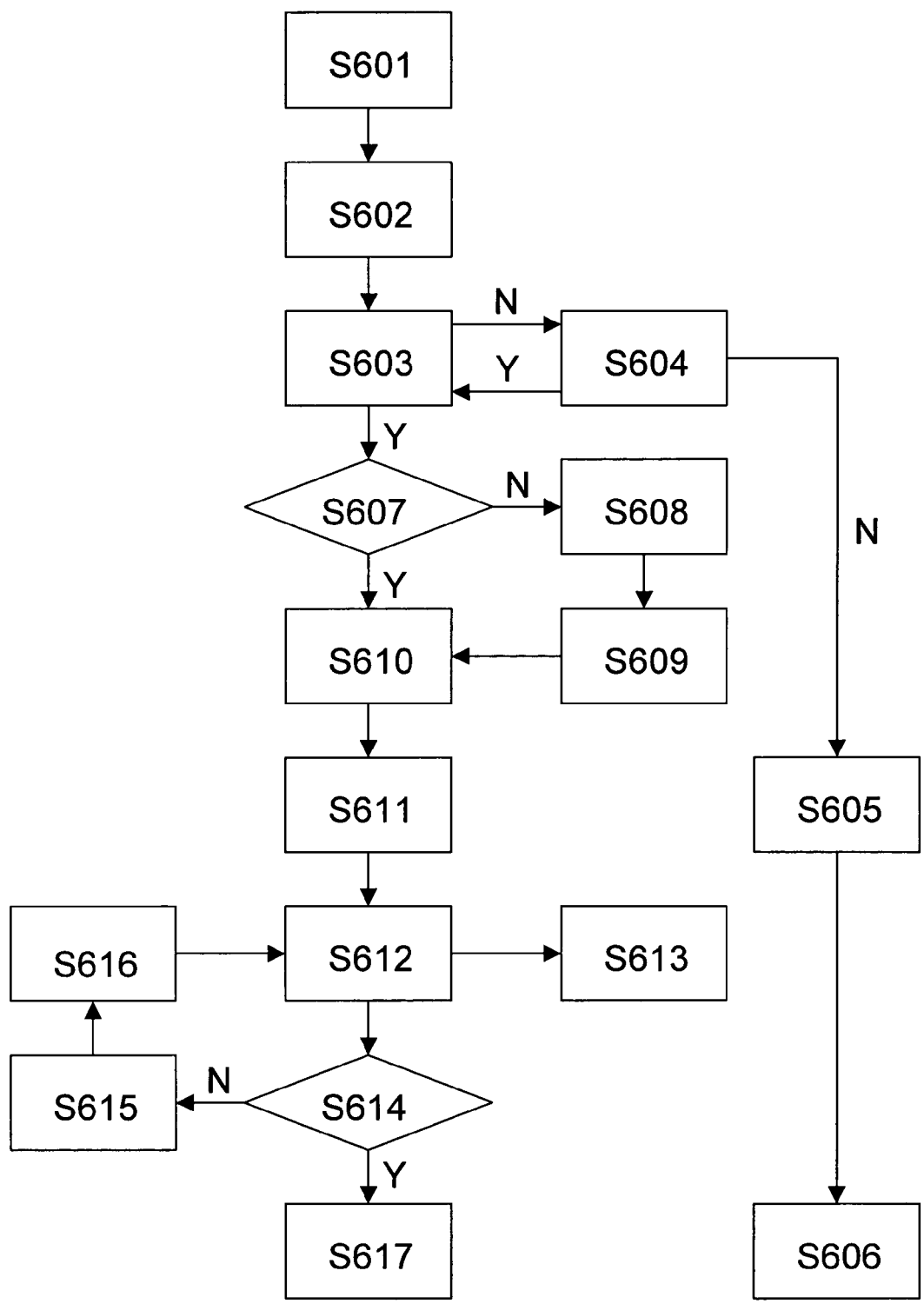
FIG. 6 is an outline of an implementation of the inventive method.

FIG. 6 is an outline of an implementation of the inventive method performed in a surveying instrument comprising a camera such as schematically disclosed in FIGS. 5A-B. Input to the method are camera calibration data comprising camera and surveying instrument parameters. The method starts in a step S601 with capturing of a first image using the camera in a first camera position and orientation, said first camera position being eccentric to a rotation center of the surveying instrument, after which in a step S602 a target is selected by identifying an object point in the first image corresponding to the target. For example, the target may be identified by selection by an operator clicking on a screen showing the image captured by the camera. Furthermore, image coordinates for the object point in the first image are measured.

After the object point has been identified, it is determined in a step S603 if the object point can be identified using image processing and recognition software. If it cannot it is determined if a pattern in the vicinity of the point is detectable. If this is not the case the uncertainty is displayed in a step S605 and suitable alternative method is used in a step S606.

If a pattern can be detected or if the point can be identified by software it is determined in a step S607 if the object point is close enough to a closest corner of the image, e.g. less than a threshold distance from the closest corner of the first image. This is to ensure that the method produces an accurate enough output. In alternative it may be determined if the object point is far enough from a point in the image corresponding to the center of the camera detector, e.g. more than a threshold distance from the point in the image corresponding to the center of the camera detector.

If the point is not close enough to a closest corner of the first image, in a step S608 a shortest distance (corresponding to a largest difference between the direction from eccentric positioned camera to target and the rotation center of the surveying instrument) is assumed and rotation angles are calculated which will result in the object point being located closer than a threshold to a closest corner in a revised first image but still within the revised first image. The surveying instrument is then rotated in accordance with the rotation angles and the revised first image is captured.

Using the first camera position and orientation, the second camera position and orientation, the first image coordinates, and camera calibration data the so called epipolar line can be identified in the revised first image on which epipolar line the object point should be located in the revised first image. In a step S609 the object point is identified by searching along the epipolar line in the revised first image and the first image coordinates are revised as the measured image coordinates of the object point in the revised first image.

In a step S610 rotation angles are calculated based on camera calibration data, the first camera position and orientation, and the first image coordinates, which rotation angles will result in the object point being located closer than a threshold to a corner of a second image but still within the second image, said corner of the second image being different than the corner of the first image to which the object point is closer than a threshold in the first image and preferably diametrically opposed to that corner.

The surveying instrument is then rotated in a step S611 according to the rotation angles and the second image is captured using the camera in a second camera position and orientation resulting from the rotation.

The object point identified in the first image is identified S612 in the second image. Using the first camera position and orientation (or revised camera position and orientation), the second camera position and orientation, the first image coordinates, and camera calibration data the so called epipolar line can be identified in the second image on which epipolar line the object point is located in the second image. The object point is identified by searching along the epipolar line in the second image. For example, the object point may be identified by selection by an operator clicking on a screen showing the second image, or preferably by means of digital image processing.

Once the object point has been identified in the second image, second coordinates of the object point in the second image are measured in a step S612. Coordinates of the target in relation to the rotation center of the surveying instrument are determined based on the first camera position and orientation (or revised first camera position and orientation), the first image coordinates, the second camera position and orientation, the second image coordinates, and camera calibration data. The coordinates of the target in relation to the rotation center of the surveying instrument are determined based on the first camera position and orientation, the first image coordinates, the second camera position and orientation, the second image coordinates, and camera calibration data. A target direction from the rotation center of the surveying instrument is determined based on the determined target coordinates in relation to the rotation center of the surveying instrument. That is, the coordinates of the target are expressed in relation to the coordinate system of the surveying instrument. Hence, the target coordinates are typically related to a coordinate system having its origin at the rotation center of the surveying instrument.

In a step S613 the distance from the instrument rotation center to the target is determined based on the target coordinates in relation to the rotation center of the surveying instrument.

In a step S614 it is determined if the accuracy of the distance and/or the direction is enough. If it is not, suitable rotation angles for additional measurement is determined in a step S615, the surveying instrument is rotated according to the suitable rotation angles and a revised second image is capture in a step S616, and the method proceeds to the step S612.

If the accuracy is enough the surveying instrument is rotated so that the line of sight of the instrument rotation center is aimed in the target direction determined in the step S617.

Figure 7A:
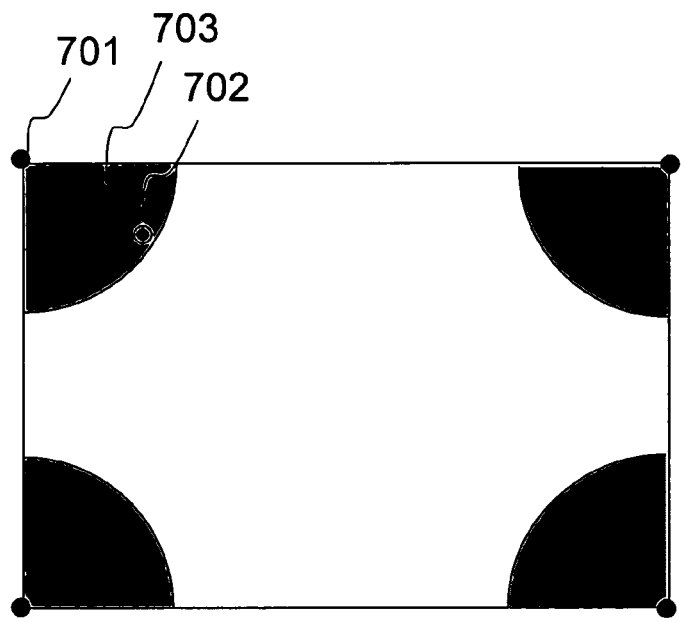
FIGS. 7a and 7b illustrate an approach for determining whether accuracy of a derived target distance and/or direction is considered good enough.
Figure 7B:
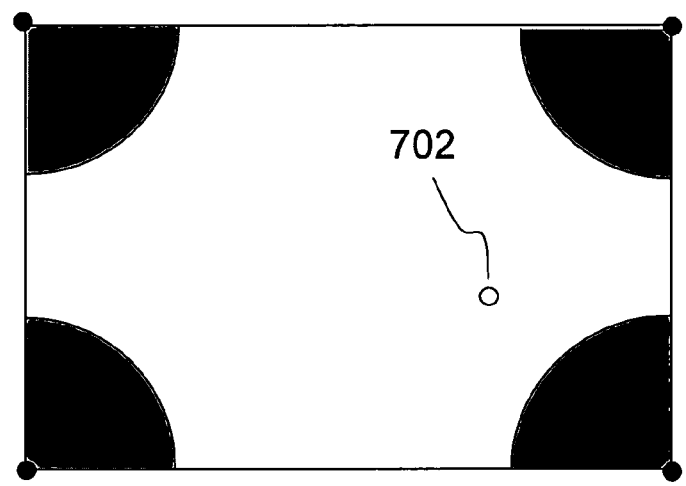

FIGS. 7A and 7B show two different images indicating image corners 701, an object point 702 and four areas 703 in each image where the accuracy of the determined target distance and/or direction is considered to be good enough. Referring again to FIG. 6, it is determined in step S607 if the object point 702 is close enough to a closest corner 701 of the image, e.g. less than a threshold distance from the closest corner of the first image in order to ensure that an accurate enough result is produced. In FIG. 7A, the object point 702 is considered to be close enough (i.e. within area 703) to the corner 701. To the contrary, FIG. 7B illustrates a situation where the object point 702 not is located in one of the four areas 703, wherein the accuracy not is considered to be good enough.

Figure 8:
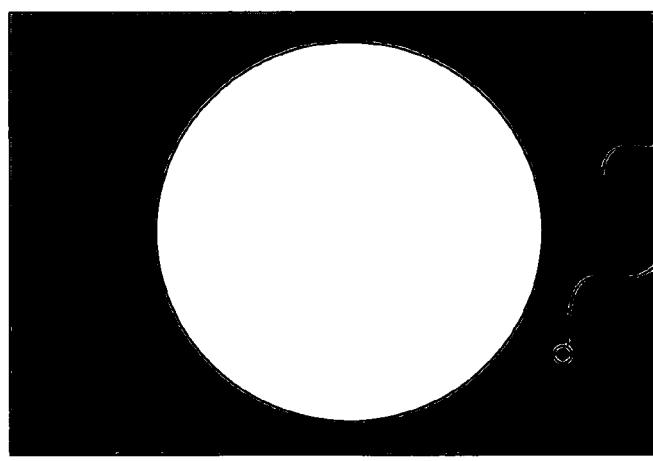
FIG. 8 illustrate an alternative approach for determining whether accuracy of a derived target distance and/or direction is considered good enough.

FIG. 8 illustrates an alternative to the thresholding approach of FIGS. 7A and 7B. In the approach of FIG. 8, it may be determined if the object point 802 is far enough from a point in the image corresponding to the center of the camera detector, e.g. more than a threshold distance from the point in the image corresponding to the center of the camera detector. In FIG. 8, the shaded area 803 indicates a far enough distance from the center. If so, the accuracy is considered to be good enough.

Figure 9:
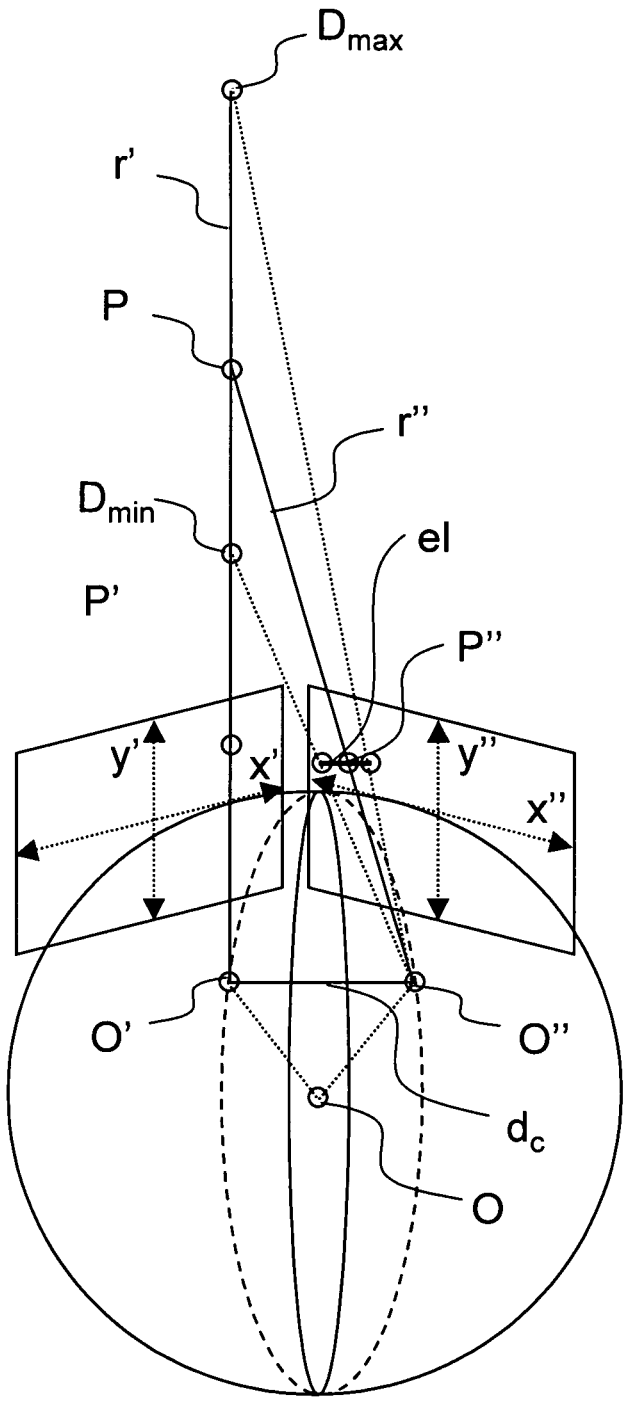
FIG. 9 schematically illustrates the capturing of two images from a camera using rotation of a surveying instrument between the capturing of a first image and a second image, and identification of an object point along a section of an epipolar line in the second image.

FIG. 9 schematically illustrates the capturing of two images from a camera using rotation of a surveying instrument between the capturing of a first image and a second image, and identification of an object point along a section of an epipolar line in the second image.

The camera has a camera center, or projection center, that is eccentric to the location O of the rotation center of the instrument. The camera may further be moved to different camera positions and orientations by rotation of the surveying instrument around its rotation center. For each rotation the camera center will be located on a sphere.

A first image is captured by the camera, when the camera center is located in a first position O' eccentric to the location O of the rotation center of the surveying instrument and the camera having a first camera orientation. A target in position P is selected by identifying an object point in a position P'(x', y') in the first image.

The camera center is then moved from the first camera position O' and orientation to a second camera position O" and orientation by rotation of the instrument around the rotation center. The distance between the first and the second camera position is denoted $d_c$. A second image is captured by the camera, when the camera center is located in the second position O" eccentric to the location O of the rotation center of the surveying instrument and the camera having the second camera orientation. The object point identified in the first image is identified in the second image in a position P"(x", y").

The so called collinearity equations are used to estimate the coordinates of P. For a background of the deriving of the collinearity equations and of calibration of a camera reference is made to WO 2005/059473.

The measured coordinates P' in the first image can be defined by the equations:

$$x' = x_0 - c_K \frac{r_{11'}(X - X_{0'}) + r_{21'}(Y - Y_{0'}) + r_{31'}(Z - Z_{0'})}{r_{13'}(X - X_{0'}) + r_{23'}(Y - Y_{0'}) + r_{33'}(Z - Z_{0'})} + \Delta x$$

$$y' = y_0 - c_K \frac{r_{12'}(X - X_{0'}) + r_{22'}(Y - Y_{0'}) + r_{32'}(Z - Z_{0'})}{r_{13'}(X - X_{0'}) + r_{23'}(Y - Y_{0'}) + r_{33'}(Z - Z_{0'})} + \Delta x$$

The measured coordinates P" in the second image can be defined by the equations:

$$x'' = x_0 - c_K \frac{r_{11''}(X - X_{0''}) + r_{21''}(Y - Y_{0''}) + r_{31''}(Z - Z_{0''})}{r_{13''}(X - X_{0''}) + r_{23''}(Y - Y_{0''}) + r_{33''}(Z - Z_{0''})} + \Delta x$$

$$y'' = y_0 - c_K \frac{r_{12''}(X - X_{0''}) + r_{22''}(Y - Y_{0''}) + r_{32''}(Z - Z_{0''})}{r_{13''}(X - X_{0''}) + r_{23''}(Y - Y_{0''}) + r_{33''}(Z - Z_{0''})} + \Delta y$$

The following parameters are known from calibration:
$X_0$; $Y_0$; $Z_0$: coordinates from camera position, '=first image; "=second image.

$r_{ij}$: elements from rotation matrix (i=1 . . . 3; j=1 . . . 3), '=first image; "=second image.

$x_0$; $y_0$: coordinates from the principle point (constant, independent of camera position)

$c_K$: camera constant (constant, independent of camera position)

$\Delta x$, $\Delta y$: parameter of distortion. The distortion is known as a polynomial of a higher degree. The distortion depends of the image position and is independent of the camera position.

All parameters are measured or known from camera calibration except from X, Y, Z which are the coordinates of P. Hence, there are three unknowns and four equations. X, Y, Z can be determined with a least square method. It should be noted that there is no limitation to two images to estimate the location of point P, but at least two images are necessary. Hence, two or more images may be used.

It should be noted that once the target has been selected by identification of the object point in the first image, a first direction r' to the target from the first position O' of the camera center can determined.

Using this first direction r' together with a maximum distance $D_{max}$ (which may be selected as infinity), and a minimum distance $D_{min}$ (which may be selected as the minimum distance of the surveying instrument) along the direction r', a section of r' can then be transformed into a section of a so called epipolar line el" in the second image on which the object point should be located in the second image. Hence, if a pattern has been recognized in the first image around the position P' of the object point in the first image, this pattern may be recognized in the second image, e.g. by means of automatic image processing, by searching along the section of the epipolar line in the second image or in an area around that section. If in alternative, an operator is to identify the target in the second image, the identification can be simplified by graphical indication of the section of the epipolar line in the second image.

In an alternative embodiment, a first image is captured by the camera, when the camera center is located in a first position O' eccentric to the location O of the rotation center of the surveying instrument and the camera having a first camera orientation. A target in position P is selected by identifying an object point in a position P'(x', y') in the first image.

The camera center is then moved from the first camera position O' and orientation to a second camera position O" and orientation by a 180-degree rotation around one rotational axis of the rotation center, e.g. the horizontal axis, followed by a further 180-degree rotation around the other rotational axis of the rotation center, i.e. the vertical axis.

It can theoretically be shown that these two 180-degree rotations result in a maximal base, i.e. a maximal distance $d_c$, between the first and the second camera position. A second image is captured by the camera, when the camera center is located in the second position O" eccentric to the location O of the rotation center of the surveying instrument and the camera having the second camera orientation. The object point identified in the first image is identified in the second image in a position P"(x", y"). The target coordinates are subsequently determined in line with the above description.

Figure 10:
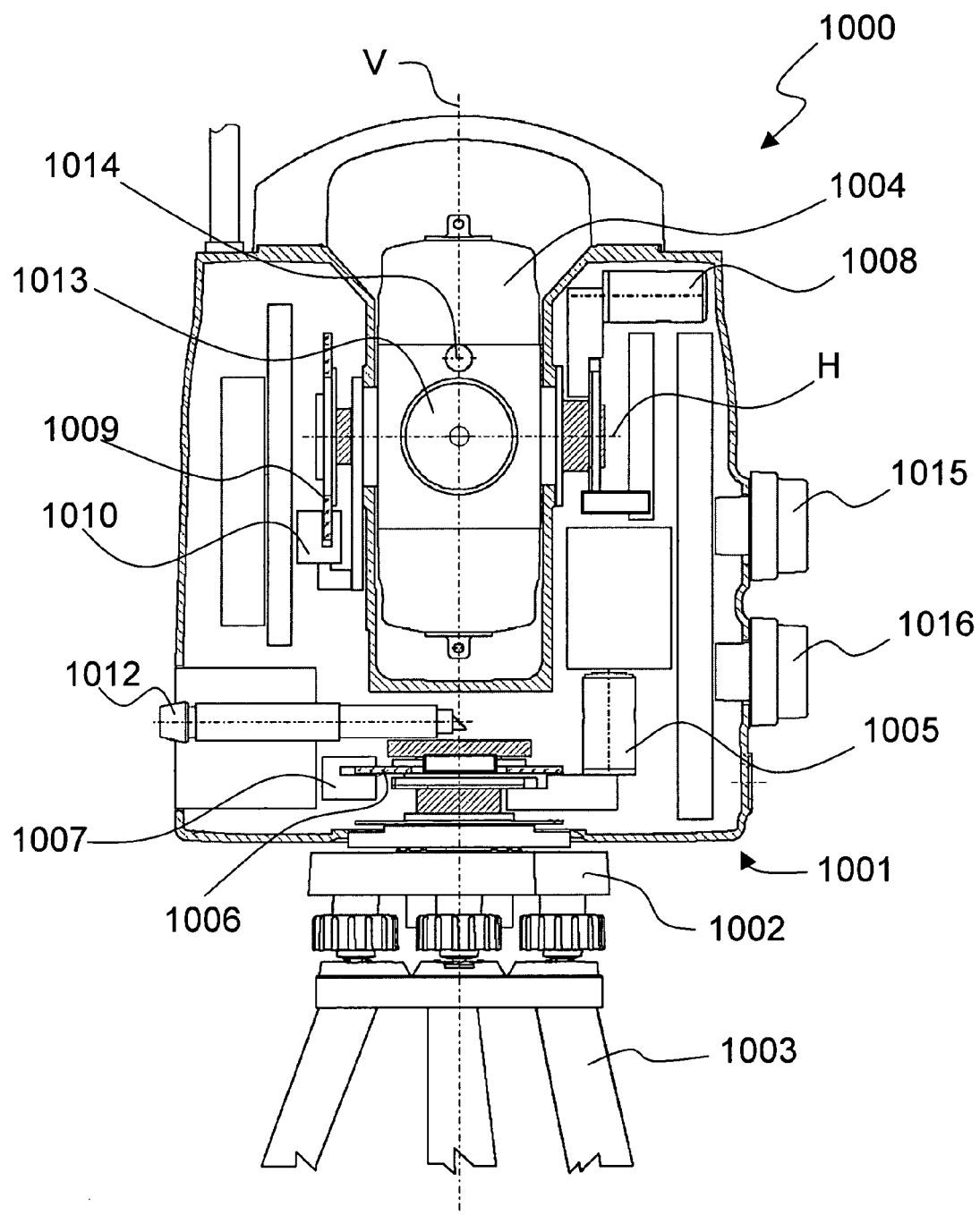
FIG. 10 shows schematically a geodetic instrument according to the present invention.

In FIG. 10, there is shown one example of a total station according to the present invention. In many aspects, the total station comprises features known from previous instruments. For example, the total station 1000 shown in FIG. 10 comprises an alidade 1001 mounted on a base 1002, and has a mounting support structure in the form of a tripod 1003. The alidade 1001 can be rotated about a vertically oriented rotation axis V, in order to aim the instrument in any desired horizontal direction. In the alidade, there is arranged a center unit 1004, which can be rotated about a horizontally oriented rotation axis H, in order to aim the instrument in any desired vertical direction. Measurements made using the total station 1000 are typically related to an origin of coordinates located at the intersection between the vertically oriented and the horizontally oriented rotation axes V and H.

For rotation of the alidade about the vertically oriented rotation axis to aim the instrument in any desired horizontal direction, there is provided drive means 1005. The rotational position of the alidade 1001 is tracked by means of a graduated disc 1006 and a corresponding angle encoder or sensor 1007. For rotation of the center unit 1004 about the horizontally oriented rotation axis, there are provided similar drive means 1008, graduated disc 1009 and sensor 1010. Moreover, the instrument has an optical plummet 1012, which gives a downwards view along the vertically oriented rotation axis. The optical plummet is used by the operator to center or position the instrument above any desired point on the ground.

As mentioned above, the instrument line of sight is centered at the intersection between the vertical and the horizontal rotation axes, and this can be seen in the figure where these axes cross in the center of a telescope 1013 in the center unit 1004.

Above the telescope, in the center unit, there is provided a camera 1014 for capturing an image or a video feed generally in the direction of the instrument line of sight. However, as shown, the camera 1014 is eccentric from the center of the telescope 1013; in this case, the camera is mounted vertically above the telescope. The instrument also comprises a display device for showing the image captured by the camera. The display may be an integral part of the instrument, but more preferably, the display is included in a removable control panel that can be used for remote control of the instrument via short range radio. It is even conceivable that the instrument is fully remote controlled, wherein the display may be in the form of a computer screen located far away from the total station, and wherein information to and from the instrument are transferred over a wireless computer or radio telephone network.

The instrument can also be manually operated for aiming towards a desired target using vertical and horizontal motion servo knobs 1015 and 1016.

The camera of the instrument is operable to capture images from different positions and orientations eccentric to a rotation center of the surveying instrument.

According to the present invention, the instrument further comprises means for identifying an object point corresponding to a selected target in the displayed image; means for determining, based on the position of the object point in the displayed images, directions towards the target from the camera in the different positions; means for measuring image coordinates of the object point in the displayed images, and means for determining target coordinates of the target in relation to the rotation center of the surveying instrument, based on the first camera position and orientation, the first image coordinates, the second camera position and orientation, the second image coordinates, and camera calibration data.

The means for identifying the object point in the captured image may take the form of a cursor that can be moved across the display. Alternatively, the display may be a touch display, where the object point is identified by simply clicking or tapping on the display. This is preferred for the identification of the object point in the first image.

The means for identifying the object point may include further functionality implemented in the form of image processing software. In such case, the further functionality would be that object points may be identified based on certain features in the captured image, for example markers or patterns located at the desired target. For example, an object point identified in a first image may be automatically identified in a second image based on patterns identified in the first image. In case the object point is automatically identified by the instrument, the user may be given the option to give a confirmation that the identified object point is correct before or during the aiming and measuring procedures. This is preferred for the identification of the object point in the second image.

The means for measuring image coordinates of the object point in the displayed images, and the means for determining target coordinates of the target in relation to the rotation center of the surveying instrument are preferably implemented in the form of computer program code that is executed in a processor. However, implementation may also be made in dedicated hardware, such as in a special purpose microprocessor or a digital signal processor (DSP), firmware or similar.

The means for rotating the instrument is preferably implemented in association with the servo control system for the instrument for controlled activation of the drive motors 1005 and 1008 (see FIG. 10).

While specific embodiments have been described, the skilled person will understand that various modifications and alterations are conceivable within the scope as defined in the appended claims.

The invention claimed is:

1. A method for determining coordinates of a target in relation to a surveying instrument comprising a camera, comprising:
   capturing a first image using the camera in a first camera position and orientation, said first camera position being eccentric to a rotation center of the surveying instrument;
   selecting a target by identifying an object point in the first image;
   measuring first image coordinates of the object point in the first image;
   rotating the surveying instrument around the rotation center so that the camera is moved from the first camera position and orientation to a second camera position and orientation, while retaining the rotation center of the surveying instrument in a fixed position, said second camera position being eccentric to the rotation center of the surveying instrument;
   capturing a second image using the camera in the second camera position and orientation;
   identifying, in the second image, the object point identified in the first image, wherein the identifying includes,
      selecting a minimum distance and a maximum distance from the first camera position along an imaging ray of the target in the first image, between which minimum distance and maximum distance the target is located,
      determining a section of an epipolar line in the second image on which the object point is located based on the maximum distance, the minimum distance, the first camera position and orientation, the second camera position and orientation, the first image coordinates, and camera calibration data, and
      identifying, along the section of the epipolar line in the second image, the object point identified in the first image;
   measuring second image coordinates of the object point in the second image; and
   determining target coordinates of the target in relation to the rotation center of the surveying instrument based on the first camera position and orientation, the first image coordinates, the second camera position and orientation, the second image coordinates, and camera calibration data.

2. The method of claim 1, wherein the minimum distance is selected as the minimum distance of the surveying instrument.

3. The method of claim 1, wherein if the identified object point is not closer than a threshold distance from a closest corner of the first image the following steps are performed:
   determining, based on the position of the object point in the first image, a revised rotation of the surveying instrument around the rotation center resulting in the object point being closer than a threshold distance from a closest corner of an image captured with the camera after the revised rotation;
   rotating the surveying instrument around the rotation center by the revised rotation so that the camera is moved from the first camera position and orientation to a revised first camera position and orientation;
   capturing a revised first image using the camera in the revised first position and orientation;
   identifying, in the revised first image, the object point identified in the first image;
   revising the first image coordinates to measured image coordinates of the object point in the revised first image.

4. The method of claim 3, wherein identifying, in the revised first image, the object point identified in the first image comprises:
   determining an epipolar line in the revised first image on which the object point is located, based on the first camera position and orientation, the revised camera position and orientation, the first image coordinates and camera calibration data; and
   identifying, along the epipolar line in the revised first image, the object point identified in the first image.

5. The method of claim 4, wherein identifying, in the revised first image, the object point identified in the first image comprises:
   selecting a minimum distance and a maximum distance from the first camera position along the imaging ray of the target in the first image, between which minimum distance and maximum distance the target is located,
   determining, based on the maximum distance, and the minimum distance, a section of the epipolar line in the revised first image on which the object point is located; and
   identifying, along the section of the epipolar line in the revised first image, the object point identified in the first image.

6. The method of claim 1, wherein the object point is identified in the first image by operator selection.

7. The method of claim 1, wherein the object point is identified in the first image by automatic image analysis.

8. The method of claim 1, wherein the object point identified in the first image is identified in the second image by automatic image analysis.

9. The method of claim 1, wherein the object point identified in the first image is identified in the second image by user selection.

10. The method of claim 1, further comprising:
determining a direction from the rotation center of the surveying instrument towards the target based on the determined coordinates of the target.

11. The method of claim 10, further comprising:
rotating the surveying instrument so that a line of sight of the surveying instrument is directed in the direction towards the target.

12. The method of claim 11, further comprising:
measuring a distance to the target using distance measuring capabilities within the surveying instrument.

13. The method of claim 1, further comprising:
determining a distance from the rotation center of the surveying instrument to the target based on the determined target coordinates.

14. The method of claim 1, wherein said rotation of the surveying instrument around the rotation center so that the camera is moved from the first camera position and orientation to a second camera position and orientation comprises:
rotating the surveying instrument 180 degrees around a first of the two rotational axes of the rotation center; and
rotating the surveying instrument 180 degrees around a second of the two rotational axes of the rotation center.

15. A computer program product stored on a non-transitory computer-readable medium, the computer program product comprising computer program code portions configured to perform the method of claim 1 when loaded and executed in a computer.

16. A surveying instrument, comprising:
a camera configured to capture images from a first camera position and orientation and a second camera position and orientation different from the first camera position and orientation, the first and second camera positions and orientations being eccentric to a rotation center of the surveying instrument, while retaining the rotation center of the surveying instrument in a fixed position;
a display configured to display images captured by said camera from the different positions and orientations;
an identifying mechanism configured to identify an object point corresponding to a selected target in the displayed images, said identifying mechanism being configured to,
select a minimum distance and a maximum distance from the first camera position along an imaging ray of the target in the first image, between which minimum distance and maximum distance the target is located,
determine a section of an epipolar line in the second image on which the object point is located based on the maximum distance, the minimum distance, the first camera position and orientation, the second camera position and orientation, the first image coordinates, and camera calibration data, and
identify, along the section of the epipolar line in the second image, the object point identified in the first image;
a measuring mechanism configured to measure image coordinates of the object point in the displayed images;
a rotating mechanism configured to rotate the surveying instrument around the rotation center of the surveying instrument; and
a determining mechanism configured to determine coordinates of the target in relation to the rotation center of the surveying instrument, based on the first camera position and orientation, the first image coordinates, the second camera position and orientation, the second image coordinates, and camera calibration data.

17. The instrument of claim 16, wherein the identifying mechanism is implemented as a cursor movable across the displayed images.

18. The instrument of claim 16, wherein the identifying mechanism is implemented using a touch display, where the object point can be identified by clicking or tapping on the display.

19. The instrument of claim 16, wherein the identifying mechanism is implemented using image processing software.

* * * * *